Jan. 29, 1957 G. L. HELLER 2,779,665
MANUFACTURE OF CARBON BLACK
Filed Oct. 27, 1954

INVENTOR.
GEORGE L. HELLER
BY
ATTORNEYS

United States Patent Office 2,779,665
Patented Jan. 29, 1957

2,779,665
MANUFACTURE OF CARBON BLACK

George L. Heller, Monroe, La., assignor to Columbian Carbon Company, New York, N. Y., a corporation of Delaware Application October 27, 1954, Serial No. 464,981

8 Claims. (Cl. 23—209.8)

This invention relates to the production of furnace carbons by thermally decomposing carbon-containing compounds and provides a new and improved method of producing furnace carbons having a high degree of the characteristic known as "structure," high acetone absorption properties, and other highly desirable characteristics.

Various processes for producing furnace carbons have been proposed whereby hydrocarbon vapors or gases are decomposed to furnace black while being rapidly carried through a furnace chamber by a stream of hot combustion gases. The present process is primarily distinguished from those prior processes by a peculiar combination of operating conditions whereby the carbon-containing compound is decomposed while slowly drifting downwardly through an atmosphere of hot furnace gases rising slowly upwardly through a vertical furnace chamber. A vertically disposed furnace chamber is used for carrying out the process so that advantage can be taken of gravity to effect the downward drift of the carbon-containing compound to be decomposed for a substantial distance through the chamber in contact with the rising hot gases.

In accordance with my present process, I use as the carbon-containing material to be decomposed, hereinafter referred to as make, an aromatic material of exceedingly high vapor density, and I establish in the furnace chamber a lazy, substantially non-oxidizing or reducing, upwardly rising atmosphere of hot furnace gases at a temperature above the decomposition temperature of the make. The upward velocity of this reducing atmosphere should be as uniform as possible throughout the transverse section of the chamber and must be below that at which the downward pull of gravity on the heavy vapors of the make would be overcome. Under these conditions the heavy vapors will slowly drift downwardly through the upwardly rising, non-oxidizing or reducing atmosphere of hot furnace gases. In their downward course, the heavy vapors are decomposed to form light, feathery flakes of furnace black of such low density that they are floated upwardly through, and out of, the furnace chamber by the upwardly rising furnace gases. In their upward course, the carbon particles thus formed come in contact with the downwardly drifting, decomposing heavy vapors and further grow to relatively long, chain-like, feathery formations which are readily separated from the effluent furnace gases.

Many of these feathery clusters grow to a size plainly visible to the naked eye and, if allowed to escape from the chamber, through an observation port, for instance, they can be seen floating like down in the outside atmosphere.

I may use as the carbon-containing material to be decomposed, i. e., the make, a material having a low vapor volume so that the weight of the vapors is of the order of 10 to 50 times that of the hot furnace gases under like temperature and pressure conditions. As this material, I have, with advantage, used a highly aromatic residue oil or tar produced by the thermal cracking of cycle stock resulting from the catalytic cracking of petroleum. Creosote or coal tar fractions of a highly aromatic nature, or materials of similar composition, may also be used, with advantage. A naphthalene or anthracene oil from normal tars has been used with advantage. Also, stocks derived from petroleum oils and having an A. P. I. gravity below 10, and preferably about 0 to 5, and having a viscosity below 100 SSU at 210° F. and a refractive index of 1.6 to 1.71 have been used, with particular advantage. These oils produce a vapor volume of less than 5 cubic feet per gallon of oil, when calculated at standard temperature and pressure conditions and, in liquid phase, have a specific gravity of about 1.03 to 1.06.

The hot furnace gases passing upwardly through the furnace chamber are, with advantage, produced by supplying air to the lower end of the furnace chamber and burning a portion of the make to supply the reducing gases and also heat for the decomposition reaction. However, a portion of the reducing gases and heat may be supplied by burning a gaseous fuel, for instance natural gas, in the lower portion of the chamber. By reason of the small amount of air supplied, the oxygen thereof is rapidly consumed and the upper portion of the furnace chamber, for instance, the upper half or more, is filled with the reducing atmosphere which, by reason of the presence therein of the decomposing make, forms a gently-billowing, undulating smoke blanket in which the carbon formation occurs above the combustion zone at the lower end of the chamber.

In carrying out the process, the material to be decomposed is sprayed upwardly through the upwardly rising furnace gases at a velocity sufficient to carry the spray high into the chamber, but insufficient to cause it to impinge on the upper walls thereof. Contact of the liquid spray with solid surfaces should be avoided. Air is introduced into the lower end of the furnace chamber in an amount much smaller than that required to burn the make and at a rate such as to establish a uniform, relatively low velocity, non-turbulent, upwardly drifting current through the furnace. The optimum gas velocity will depend somewhat upon the particular material being decomposed but, as previously noted, must be sufficiently low to permit the downward drift of the heavy vapors countercurrent to the rising furnace gases. Also, as previously noted, it is highly desirable that the upward flow of furnace gases be as uniform as possible over any given transverse section so that the downward drift of the decomposing vapors and the upward floating of the carbon are substantially uniform throughout and channeling avoided.

The furnace chamber is, with advantage, thermally insulated and the temperature therein is maintained sufficiently high to vaporize, at least the major portion of the spray and to decompose the resulting vapors, but insufficiently high to carbonize the liquid as it courses upwardly through the chamber.

The invention will be further described and illustrated with reference to the accompanying drawings which represent apparatus particularly adapted to the carrying out of the process. It will be understood, however, that the invention is not restricted to the particular apparatus shown or the particular embodiment of the process illustrated.

Figure 1 of the drawings is a somewhat diagrammatic, vertical, sectional view of a furnace and essential auxiliary apparatus;

Figure 1:
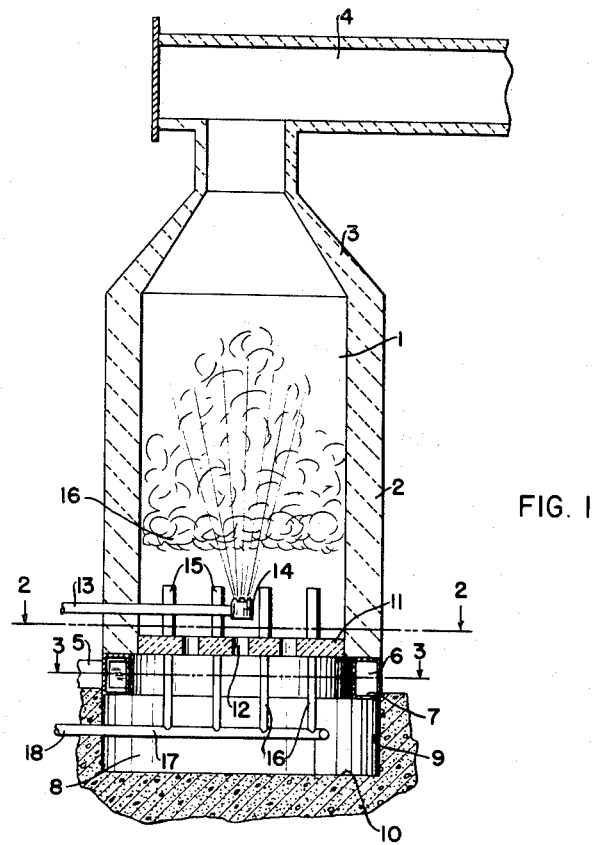
Figure 2:
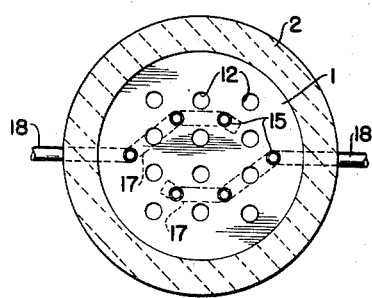
Figure 2 is a horizontal section along the lines 2—2 of Figure 1.
Figure 3:
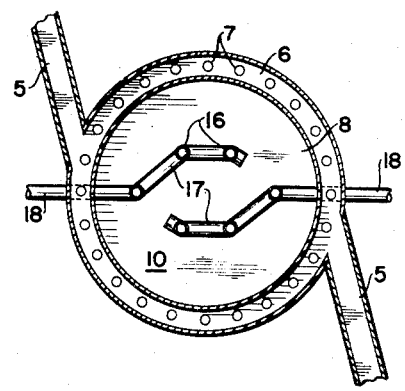
Figure 3 is a horizontal section along the lines 3—3 of Figure 1.

The vertical chamber 1 is enclosed by the cylindrical walls 2 of a furnace refractory and the tapering walls 3 of similar material. The upper end of the chamber opens into a breeching 4 leading to a conventional cooling and separating system.

Air is supplied through conduits 5 to the annular conduit 6 and passes therefrom through ports 7 into the air distributing chamber 8 delineated by cylindrical walls 9 and base 10, which may be of concrete and form the foundation for the furnace.

Just above the air chamber 8, there is a refractory floor-plate 11, forming the floor of the furnace chamber, through which there extend air ports 12 distributed over the area of the floor-plate and through which air passes into the furnace chamber.

The carbon-containing material to be decomposed, i. e., the make, is supplied through conduit 13 to spray head 14, coaxially positioned in the furnace chamber. The spray head is shown as being equipped with three nozzles, but it will be understood that other types of spray heads may be used. Advantageously, the spray head is of the two-fluid type in which steam is used to assist in the atomizing and spraying of the make. Nozzles of this type are well-known and readily available and need not here be described in further detail.

The conduit 13 is, with advantage, jacketed or otherwise protected from excessive furnace temperature. We have, with advantage, supplied atomizing steam to spray head 14 through an annular conduit forming a jacket for conduit 13. Also, the conduit may be protected by a water jacket where desirable.

Gas burners are shown at 15 which may be used in warming-up the furnace before operation has begun or as an auxiliary source of heat during operation, as hereinafter more fully described. A fuel gas, for instance natural gas, is supplied to these burners through risers 16 leading from manifolds 17, to which gas is supplied by conduits 18.

It will be understood that other means of supplying air to the lower end of the furnace chamber and uniformly distributing it over the cross-sectional area of the chamber may be used and that other means for preheating the furnace chamber, or for supplying auxiliary heat or hot gases during operation, may be employed. Also, the invention is not restricted to the use of a cylindrical chamber, for instance, a rectangular chamber may be employed in carrying out the process. Further, in place of a single coaxially positioned spray head, a plurality of such spray heads may be used, symmetrically positioned in the lower end of the chamber.

The furnace walls should be covered exteriorly by a layer of heat-insulating material which, in turn, may be covered by a metal sheath, according to established practice.

In carrying out the operation, a requisite amount of air is supplied to the lower end of the furnace chamber 1 and is uniformly distributed over the transverse area thereof by air ports, 12 and slowly rises through the combustion zone at the lower end of the chamber. Advantageously, the chamber is first preheated to about 1600° to 1700° F. before the spraying of the liquid make is begun. This preheating may be effected by means of the burner 15, or by any other suitable means. After the furnace has been brought to operating temperature, the burners 15 may be shut off, where desired, and the spraying of the make effected through spray head 14.

In normal operation, the smoke blanket will fill the entire upper portion of the chamber extending downwardly to a level approximating that indicated at 16, i. e. ½ to ¾ of the height of the vertical chamber. Below this smoke blanket, there is a substantial burning of the make, and the free oxygen of the entering air is thereby consumed in the lower end of the chamber. The oxygen is also consumed, in part, by the burning of the auxiliary gas, when that is being used. Above the level indicated at 16, there is a reducing atmosphere. The liquid spray extends well up into the smoke blanket and, in its upward passage, it is partially, or possibly completely, vaporized. The initial velocity of the spray will depend largely upon the height of the furnace chamber.

The furnace gas velocity, as previously noted, is insufficient to carry the resultant heavy vapors, or any unvaporized particles of oil, out of the chamber and, because of their higher density, the vapors and oil particles drift downwardly through the smoke blanket and, by reason of the high furnace gas temperature, are decomposed to form the feather-like flakes of carbon previously described. By reason of their low specific gravity and their increased bulk and surfaces, these flakes of carbon are floated upwardly and out of the furnace through the breeching 4 by the rising hot furnace gases and are separated and collected in any suitable manner well known to the art.

The operating temperatures within the furnace chamber may be varied over a considerable range depending upon the characteristics of the make and the characteristics of the product desired. Where an oily black is required, temperatures within the range of about 1200° to 1800° F. are, with advantage, maintained in the upper portion of the chamber. Where a substantially dry black, i. e., one relatively free from extractible material, such as are used in rubber compounding, is desired, temperatures in the upper portion of the furnace chamber are, with advantage, maintained within the range of about 1600° to 2300° F. These higher temperatures may be attained as previously indicated, by means of the auxiliary gas burners in the lower portion of the furnace chamber, or may be attained, without using auxiliary gas, by burning a greater proportion of the make by increasing the amount of air supplied to the chamber.

The height of the smoke blanket above the spray head 13 may be varied somewhat by control of the pressure on the furnace, as by means of dampers positioned in the effluent breeching 4. Usually the pressure on the furnace will be maintained at about atmospheric pressure, or slightly less, say about two-tenths inch of water below atmospheric pressure.

The liquid make is, with advantage, preheated before being sprayed into the furnace chamber. Preheating is particularly desirable where the make is of an extremely viscous nature, such as characteristic of heavy tarry residues.

The optimum velocity of air and reducing gases upwardly through the furnace chamber will depend largely upon the particular make being used. Usually, a gas velocity within the range of 1 to 6 feet per second has been found most satisfactory. For more dense vapors, a somewhat higher gas velocity may be used.

By this process, I have obtained excellent yields of black having highly desirable characteristics ranging as high as 5 pounds or more per gallon of make. Particularly high yields have been obtained where a portion of the heat required for the decomposition reaction is supplied by burning auxiliary gas, thus reducing the proportion of make required to be burned.

My improved process, and the advantages derived therefrom will be illustrated by the following specific example of operations carried out in apparatus of the type represented by the drawings and comprising a cylindrical furnace chamber about 15 feet high and 8 feet 10 inches inside diameter.

Example I

Air was supplied to the chamber at the rate of 75,000 cubic feet per hour. Auxiliary gas was burned at the rate of 8,835 cubic feet per hour. The make, consisting of a highly aromatic oil produced by the thermal cracking of catalytic cycle stock, marketed as Pressure Tar, was sprayed into the furnace chamber at the rate of 156 gallons per hour. The head furnace temperature was maintained within the range of 2020° to 2420° F. and the pressure tar was sprayed into the chamber through a single, three-nozzle spray head coaxially positioned about 13 inches above the chamber floor, by means of steam at a pressure of 40 to 150 pounds per square inch. By this operation, yields ranging from 4.55 to 5.32 pounds per gallon of make were obtained. The carbon product had an ABC color value of 57 to 60 and an oil absorption value of 16.9 to 20.4 gallons per 100 pounds of black.

Additional runs were carried out in the same apparatus under conditions, and with the results set forth in the following tabulation:

| Example | II | III | IV | V |
|---|---|---|---|---|
| Air, cu. ft./hr | 150,000 | 125,000 | 125,000 | 100,000 |
| Gas, cu. ft./hr | 17,700 | 14,700 | 14,700 | 11,750 |
| Oil, gals./hr | 240 | 264 | 264 | 168 |
| Head Furnace Temp., °F | 2,050-2,160 | 2,330-2,165 | 2,030-2,165 | 2,250-2,300 |
| Steam Pres., lbs./sq. in | 100 | 60 | 50 | 100 |
| Yield, lbs./gal | 2.1-7.6 | 3.21 | 2.21 | 4.23-4.56 |

In Examples II, III, and V, the make was an aromatic petroleum residue having a refractive index of 1.651, an API gravity of .2, a viscosity at 210° F. of 52 (SSU) and a boiling range from 500° F. to 750° F. The make used in Example IV was an aromatic petroleum residue from a different source but having characteristics comparable to those just noted.

In each of the foregoing runs, the hot gases were floated upwardly through the furnace chamber at a velocity within the range of 1.8 feet per second to 5.2 feet per second.

These carbon products have exceptionally high liquid-holding capacity and good electrical conductivity and are therefore useful in the making of dry cells in which these two properties are desirable. They do not pack readily, have a very low density, and an extraordinary capacity for retaining trapped gases. Because of these properties, they are especially useful as heat insulators. They are also valuable for use in rubber compounding, particularly where exceptionally smooth processing rubber stock of high rebound rating is desired. When so used in rubber compounding, they have been found to produce cool running automobile tire carcass stock.

Compared with furnace blacks produced under conditions of high turbulence, the product of the present invention is of relatively coarse particle size but has extraordinary high structure.

As previously indicated, where it is desired to produce a high structure carbon containing a relatively high proportion of oil, or extractible material, the burning of the auxiliary gas may be eliminated, the reducing atmosphere and the heat required for the decomposition being supplied solely by the burning of a portion of the spray by contact with the air near the lower end of the furnace chamber. Where the auxiliary gas burners are used, they should be so adjusted as to produce a quiet flame and so distributed over the furnace chamber as to avoid localized updrafts of higher velocity than that of the surrounding furnace atmosphere.

The following runs were made in apparatus of the type used in the preceding examples, but in which the cylindrical furnace chamber was 7 feet 9 inches inside diameter. In these operations, no auxiliary gas was used after the furnace had been brought to operating temperatures. The operating conditions and results obtained are set forth in the following tabulation:

| Example | VI | VII |
|---|---|---|
| Air, cu. ft./hr | 75,000 | 75,000 |
| Oil, gals./hr | 175 | 130 |
| Head Furnace Temp., °F | 1,920 | 1,900 |
| Steam pressure, lbs./sq. in | 70 | 70 |
| Yield, lbs./gal | 4.5 | 2.93 |

In run VI, the furnace pressure was 0.2 inch of water below atmospheric and in run VII, the pressure was 0.1 inch water below atmospheric. The product of run VI had an ABC color rating of 68, an oil absorption value of 19 gallons per 100 lbs. of black, an acetone absorption value of 5.25 gallons per 100 lbs. of black and contained 2.4% of extractible matter.

The product of run VII had an ABC color rating of 69, an oil absorption value of 19.2 gallons per 100 lbs. of black, an acetone absorption value of 5.5 gallons per 100 lbs. of black and contained 4.20% of extractible matter.

In these two runs, the hot furnace gases drifted upwardly through the furnace chamber at a velocity of approximately 3 feet per second.

The make used in run VI was a heavy petroleum tarry residue of the type previously described, this residue having a refractive index of 1.644; a specific gravity of 1.042; and an API gravity of 4.3. Its SSU viscosity at 100° F. was 360; at 130° F. was 140; and at 210° F. was 46. This make was distillable to the extent of 85%, leaving a residue of 15%. Its distillation analysis was as follows:

| | |
|---|---|
| IBP | ° F.. 398 |
| 5% over | 546 |
| 10% | 610 |
| 20% | 658 |
| 30% | 682 |
| 40% | 700 |
| 50% | 714 |
| 60% | 726 |
| 70% | 760 |
| 80% | 775 |
| End point | 780 |

The make used in run VII was a mixture of 65% heavy petroleum tarry residue and 35% coal tar oil, the respective materials having the following properties:

| | Petroleum Residue | Coal Tar Oil |
|---|---|---|
| Refractive Index | 1,550 | 1,580 |
| Specific Gravity | 0.9593 | 1.000 |
| API Gravity | 16.0 | 10.0 |
| Viscosity, SSU at 130° F | 37 | 31 |
| Distillation: | | |
| IBP ° F | 406 | 355 |
| 5% over | 440 | 392 |
| 10% | 466 | 400 |
| 20% | 494 | 404 |
| 30% | 524 | 418 |
| 40% | 560 | 428 |
| 50% | 594 | 434 |
| 60% | 616 | 442 |
| 70% | 636 | 450 |
| 80% | 664 | 462 |
| 90% | 708 | 492 |
| End Point | 710 | 562 |
| Recovery percent | 92.0 | 97.5 |
| Residue do | 8.0 | 2.5 |

A further run was made using the apparatus of Examples VI and VII and using as the make the coal tar oil previously described, unblended with petroleum residue. Other operating conditions and results of the operation are set forth in the following tabulation:

| Example | VIII |
|---|---|
| Air, cu. ft./hr | 75,000 |
| Oil, gals./hr | 175 |
| Head Furnace Temp., °F | 1,870 |
| Steam pressure, lbs./sq. in | 70 |
| Yield, lbs./gal | 2.6 |

The ABC color value of the resultant product was 68; its oil absorption was 24.0 gallons per 100 lbs., and the percent of extractible matter present was 4%.

Under presently preferred operating conditions, the contact time, i. e., the period during which the carbon particles are in contact with the hot gases in the furnace chamber, is of the order of 2 to 10 seconds, more advantageously about 4–5 seconds.

It will be seen from the foregoing description, that the furnace chamber is traversed three times by the make or decomposition products of the make, namely; (1) the liquid make is carried upwardly through the chamber by the kinetic energy of the spray and during this upward passage is highly heated and vaporized; (2) the resultant heavy vapors drift downwardly through the furnace chamber by the influence of gravity, while being decomposed to feathery flakes of carbon black; and (3) the resultant flakes of carbon drift upwardly through the chamber in contact with the hot vapors of decomposing make and thus act as nuclei for further cluster growth, and are dried out before leaving the chamber, the extent of drying out, i. e., loss of extractible matter, depending upon the furnace temperature employed.

I claim:

1. A process for making furnace carbons by thermally decomposing carbon-containing compounds which comprises spraying a liquid aromatic, carbon-containing compound, having a vapor volume not exceeding 5 cubic feet (calculated at standard temperature and pressure conditions) per gallon of liquid, upwardly into a vertically elongated furnace chamber, passing a gently flowing current of air upwardly into the lower end of the chamber in contact with said spray, the proportion of oxygen so supplied by the air being substantially less than that required to burn all of the carbon-containing material so introduced, burning a portion of the carbon-containing material in the lower end of said chamber and thereby generating heat and combustion gases and consuming substantially all of the free oxygen of the air, so regulating the quantity of air and of the carbon-containing material supplied to the lower end of said chamber as to maintain in the chamber above the burning zone a non-turbulent, slowly rising atmosphere of reducing gases, at a temperature at which the carbon-containing material is at least partially vaporized as it passes upwardly as a liquid spray through the reducing atmosphere to form dense vapors, and at which the resultant vapors are decomposed to carbon, and at an upward velocity substantially below that at which the downward pull of gravity on the dense vapors is counteracted by the upwardly rising gases, and thereby causing said dense vapors to drift downwardly in the chamber, decomposing the downwardly drifting vapors by heat absorbed from the hot gases to form flakes of carbon in gaseous suspension and floating the carbon flakes upwardly, through, and out of, the furnace chamber in the upwardly rising furnace gases.

2. The process of claim 1 in which the vapor density of the carbon-containing compound is within the range of from 10 to 50 times that of the hot furnace gases, under like temperature and pressure conditions.

3. The process of claim 1 in which the carbon-containing compound is a highly aromatic residue oil resulting from the thermal cracking cycle stock from the catalytic cracking of petroleum.

4. The process of claim 1 in which the carbon-containing material is creosote.

5. The process of claim 1 in which the carbon-containing material is a stock derived from petroleum oil and having an API gravity below 10, a viscosity at 210° F. below 100 SSU and a refractive index within the range of 1.6 to 1.71.

6. The process of claim 1 in which the temperature of the reducing atmosphere of the furnace is maintained within the range of 1200° to 2300° F.

7. The process of claim 1 in which a fuel gas is burned in the lower end of the furnace chamber to assist in the maintaining of the furnace temperature.

8. The process of claim 1 in which the carbon-containing material is sprayed into the furnace chamber in admixture with steam.

References Cited in the file of this patent

UNITED STATES PATENTS

| | | |
|---|---|---|
| 1,999,541 | Keller | Apr. 30, 1935 |
| 2,705,189 | Eckholm | Mar. 29, 1955 |

FOREIGN PATENTS

| | | |
|---|---|---|
| 461,497 | Great Britain | Feb. 17, 1937 |
| 497,377 | Belgium | Aug. 31, 1950 |